Jan. 18, 1938.  C. L. HUTH  2,106,098

LAWN MOWER

Filed March 26, 1935

INVENTOR.
Charles L. Huth
BY
John F. Bangs
ATTORNEY.

Patented Jan. 18, 1938

2,106,098

UNITED STATES PATENT OFFICE 2,106,098

LAWN MOWER

Charles L. Huth, Milwaukee, Wis.

Application March 26, 1935, Serial No. 13,152

1 Claim. (Cl. 56—252)

My invention relates to lawn mowers such as are used in the cutting of grass or the like and more particularly to a type of lawn mower that employs revolving blades in conjunction with a stationary blade.

An object of my invention is to provide a means of cutting the grass close to a building, fence, tree or the like.

Another object of my invention is to provide a lawn mower that will maintain an even cutting height at all times.

Still another object of the invention is to provide a means for propelling the device over the ground that will permit a free action of the device without imparting pressure onto same in a downwardly direction by the operator.

A still further object of my invention is to provide a lawn mower that is light in weight, practical in design, economical to construct, yet efficient in its operation.

The invention is fully disclosed in the following specification of which the accompanying drawing is a part, and in which the separate parts of my improvements are designated by suitable reference characters in each of the views, and in which Fig. 1 shows a fragmentary cross sectional top view of the device taken at line A—A in Fig. 2.

Figure 1:
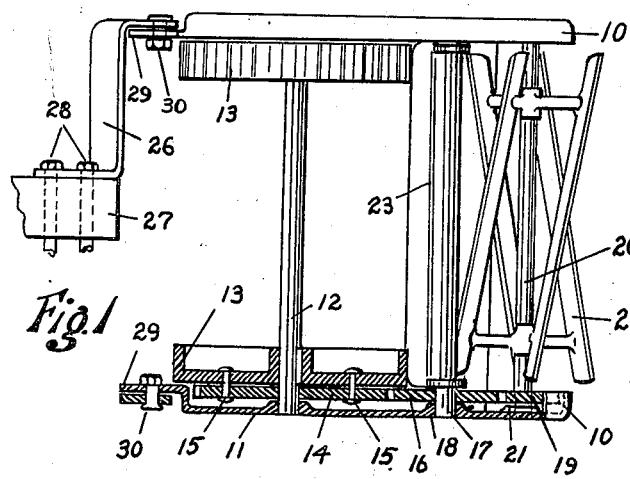
Figure 4:
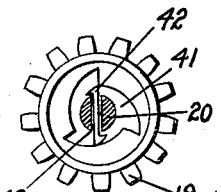
Fig. 4 is a detail of the conventional clutch arrangement.
Figure 2:
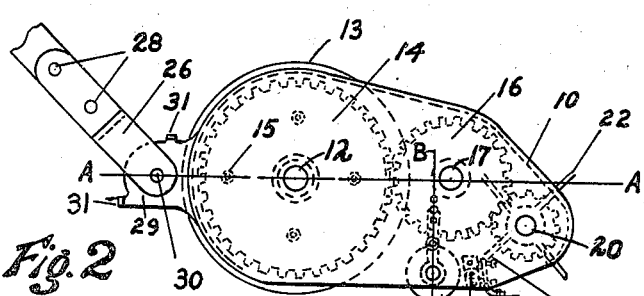
Fig. 2 shows a side view of the device.
Figure 6:
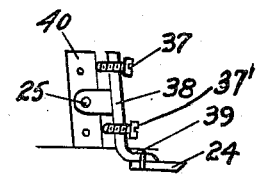
Fig. 6 shows a stationary blade mounting illustrating the adjustment features.
Figure 3:
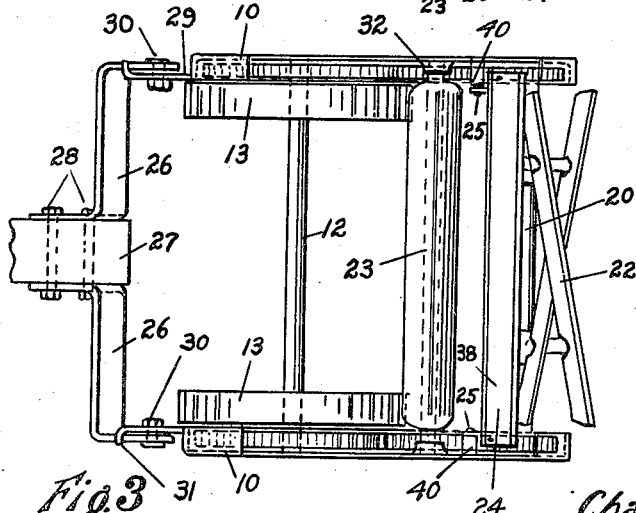
Fig. 3 shows a bottom view of the device.
Figure 5:
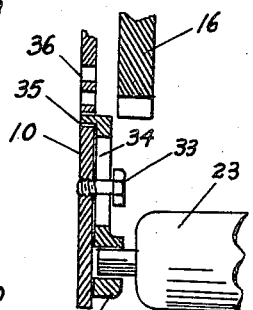
Fig. 5 is a detailed cross sectional view of the roller mounted at line B—B of Fig. 2.

Similar characters of reference indicate corresponding parts throughout the several views and referring now to the same, character 10, indicates vertically disposed side plates constructed to enclose the drive gear arrangement of the device.

There are bearings 11, on the inside of the plate 10, for mounting the horizontal axle shaft 12, supporting the annular traction members 13, forming a rest for the rearward end of the entire unit. The drive gear 14, fastened to the traction members 13, at 15, actuate the intermediate gear 16, journaled to the plates 10, at 18, by means of the horizontally disposed shaft member 17. The driven gear 19, is in the form of a clutch arrangement equipped with radial ratchet teeth 41, and operates the pawl 42, slidably engaged in the slot 43, of the shaft 20. This shaft 20, mounted in bearings 21 on the plates 10, has a plurality of parallel blades 22 and revolves by energy imparted to the clutch gear 19, when the pawl 42 engages one of the ratchet teeth 41 in the said direction of travel of the mower, and spins freely, when the motion of the gear 19 is stopped by the motor coming to rest or is caused to travel in a backward direction.

The horizontally disposed cylindrically shaped roller 23, supported by adjustably mounted bearings 32, supports the forward end of the entire device. These bearings 32, are held against the inside of the vertical side plates 10, by a screw 33, engaging a threaded aperture in the plate 10, through a slot 34. There is a right angularly disposed section 35, on the upper end of the bearing 32, that engages one of a plurality of apertures 36, in the vertical side plates 10. The projecting member 35, entering corresponding apertures 36, on both vertical plates 10, raise or lower the roller 23, and govern the height that the stationary blade 24, is elevated from the ground. The height of this blade 24, has a direct effect on the length of the grass after being cut. The blade 24, fastened to the horizontal blade support 38, at 39, is pivotly mounted at 25, to the block 40, fastened to the plates 10, and the screws 37 and 37', permit adjustment of the blade support 38, which carries the blade 24.

The entire unit is propelled over the ground by means of the operator exerting a pressure on the handle 27, equipped with angularly disposed arms 26, fastened to it by the bolts 28. This handle arrangement is pivotly mounted at 30, to the vertically disposed plates 29, integral with the side plates 10. The plates 29, have small angular lugs 31, integrally formed at the extreme rearwardly and upper edge to limit the pivot action of the handle assembly.

In operation it is manifest to one familiar with the art that the device is capable of cutting grass close to any obstruction due to its construction. The revolving blades 22, having a comparatively small circumferential travel allow the stationary blade 24, to be mounted toward the forward end, supported at all times by the roller 23, adjacent to the entire length of the blade 24. Thus the up and down travel of the traction members due to the uneven surface of the ground in no way affects the heighth of the blade 24, which is kept at a constant heighth from the ground.

The device is further constructed to allow for operation close to any obstruction such as a wall or the like due to the comparative shallow end plates 10, supporting and encasing the drive gear assembly and the handle arrangement mounted as shown and described at a point rearwardly from the actual drive axle shaft 12, imparts free action to the entire unit eliminating the uneven results obtained when using the conventional type of lawn mower.

While I have herein shown a single embodiment of my invention for the purpose of a clear disclosure it is manifest that any changes may be made in the arrangement, size and configuration of the various parts within the scope of the appended claim.

What I claim and desire to secure by Letters Patent in the United States, is:

In a lawn mower, a body comprising spaced vertical side plates, a driven shaft journalled in bearings at the inner sides of said side plates toward the said ends thereof, cutters carried by said driven shaft, a stationary cutter bar supported from said plates and extending beneath the cutter assembly, a ground roller carried by said plates directly in rear of said cutter bar, a drive shaft carried by said side plates toward the rear ends thereof, traction wheels mounted on said drive shaft at the inner sides of said plates, gears mounted on said traction wheels adjacent said side plates, gears mounted on said driven shaft adjacent said side plates, an intermediate shaft carried by said plates, gears on said intermediate shaft meshing with the gears on both the traction wheels and the driven shaft, and an operating handle pivotally connected to said side plates at the rear ends thereof and at points thereon lying in the horizontal plane of the traction wheel shaft, said side plates having their top and end edges inwardly flanged to form a housing overlying the peripheries of said gears.

CHARLES L. HUTH.